H. BESSER.
TIRE.
APPLICATION FILED APR. 30, 1919.

1,372,116.

Patented Mar. 22, 1921.
2 SHEETS—SHEET 1.

Herman Besser
INVENTOR

BY
Geo. B. Willcox
ATTORNEY

H. BESSER.
TIRE.
APPLICATION FILED APR. 30, 1919.

1,372,116.

Patented Mar. 22, 1921.
2 SHEETS—SHEET 2.

Herman Besser
INVENTOR
BY
Geo. B. Willcox ATTORNEY

UNITED STATES PATENT OFFICE.

HERMAN BESSER, OF ALPENA, MICHIGAN.

TIRE.

1,372,116. Specification of Letters Patent. Patented Mar. 22, 1921.

Application filed April 30, 1919. Serial No. 293,880.

*To all whom it may concern:*

Be it known that I, HERMAN BESSER, a citizen of the United States, residing at Alpena, in the county of Alpena and State of Michigan, have invented certain new and useful Improvements in Tires; and I do hereby declare the following to be a full, clear, and exact description of the invention, such as will enable others skilled in the art to which it appertains to make and use the same.

This invention relates to tires for vehicle wheels and the improvement consists in certain novel constructions and arrangements of parts comprising a rim, whereby the objects of my invention are attained.

These objects are, first, to provide a cushion rim, the degree of yield or elasticity of which can be regulated by proper spacing of the cushion members, that is, the resilience of the tire can be increased by spacing the cushion members farther apart and decreased by placing them closer together.

A further object is to provide a cushion outer rim made in sections, whereby a practically continuous tread may be formed and treads to suit wheels of different diameters can be built up from the units forming the members of the outer tread.

With the foregoing and certain other objects in view which will appear later in the specification, my invention consists in the devices described and claimed and the equivalents thereof.

In the drawings, Figure 1 is a side view, partly in section and broken away, showing part of the rim of a wheel with my improved tire tread thereto.

Figures 3, 4:
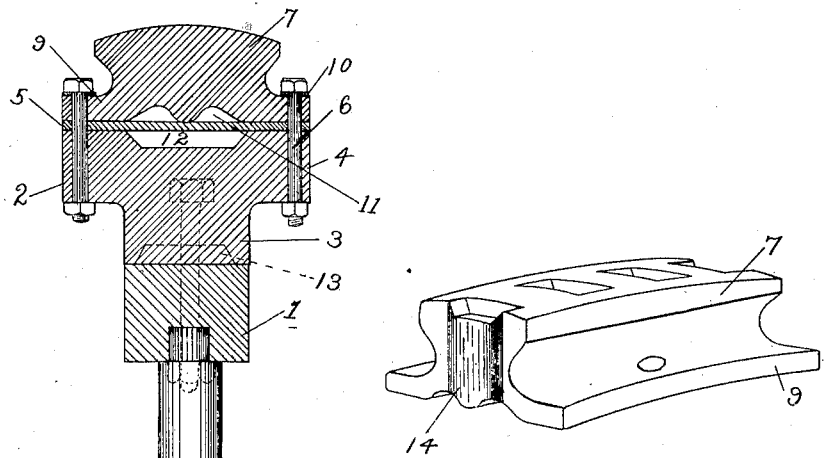
Fig. 3 is a cross section of the line 3—3 of Fig. 1.
Fig. 4 is a perspective view of one of the resilient pads comprising the outer tread.

Upon the wheel rim 1, I mount a number of resilient cushions 2, each of said cushions formed of a flanged base 3, surmounted by a transverse outer cushion member 4 that extends sidewise or lateral beyond the edges of the base 3. These cushions are bolted to the rim 1 as shown in Figs. 1 and 3 and are spaced apart a greater or less distance, depending upon the degree of cushioning effect desired, the greater the distance between the cushions, the greater will be the amount of yield of the tire under the given load.

A continuous resilient circumferential band 5 of spring steel or other suitable material encircles the outer faces of the cushion members 4 and is bolted thereto by means of bolts 6 which pass through the laterally projecting ends of the cushion members 4.

Figure 1:
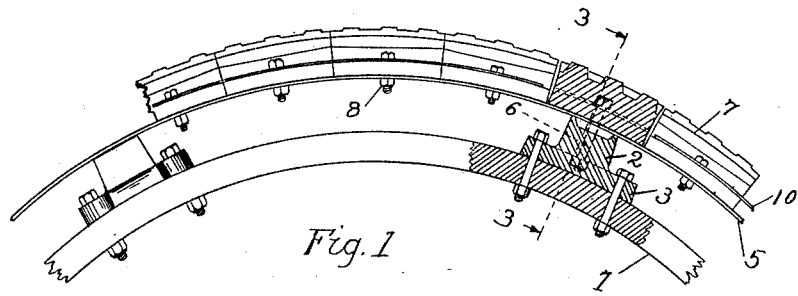
Figure 2:
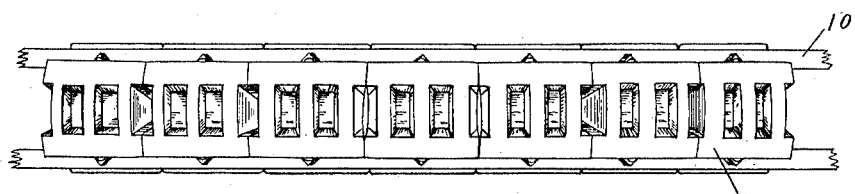
Fig. 2 is an plan view of a wheel tread showing the outer resilient cushions.
Figure 5:
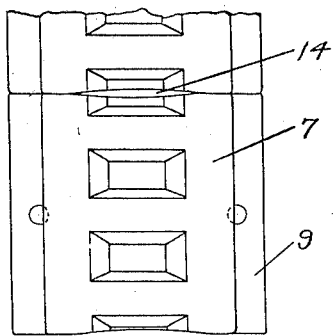
Fig. 5 is a top plan view partly broken away, showing two such pads.
Figure 8:
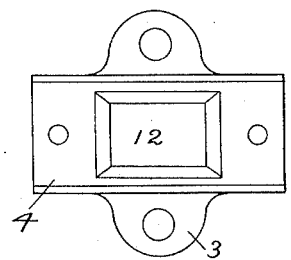
Fig. 8 is a top plan view of the same.

To the outer face of band 5 a plurality of resilient pads 7 are secured, arranged end-to-end, as shown in Figs. 1, 2 and 5, forming a continuous resilient outer tread.

A greater or less number of pads are employed, according to the size of the wheel.

The pads are secured to band 5 by means of bolts 6 at each place where one of the cushions 2 is located and by short bolts 8 in intermediate places. I prefer in practice to provide the pads 7 with lateral flanges 9 and to surround the flanges by metal bands or hoops 10 through which the bolts 6 and 8 pass.

Figure 6:
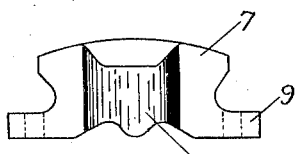
Fig. 6 is an end view of parts shown in Fig. 5.
Figure 9:
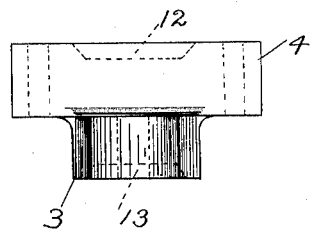
Fig. 9 is an end view.
Figure 7:
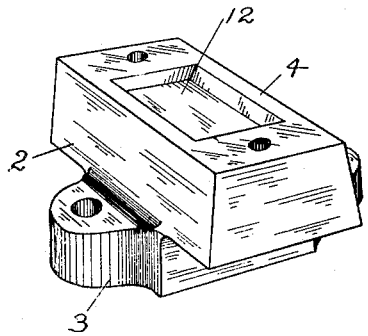
Fig. 7 is a perspective view of one of the inner resilient cushions.

The under face of pad 7 is preferably recessed or relieved, as at 11, and the faces of cushion 2 and base 3 are recessed as at 12 and 13 respectively, to increase the resilience of the inner cushions. The adjacent ends of successive pads 7 are also recessed, as at 14, Figs. 5 and 6, so that the outside edges of adjacent pads meet, but the middle part of the ends of the pads are slightly separated to reduce wear at the ends of the pads.

By the means above described I have produced a resilient tire capable of being applied to independent units, the same units adapted to suit rims of various diameters and have made the tire of such construction that the amount of resilience can be easily regulated without altering the construction of the units comprising the tire structure.

Having thus described my invention, what

I claim and desire to secure by Letters Patent is:

In combination with a wheel rim, a plurality of individual resilient cushions spaced apart circumferentially around said rim, each of said cushions formed with a flanged base secured to said rim and a resilient member having lateral extensions and a recessed face, a yieldable metal band encircling the outer recessed faces of said cushions and secured to the laterally extending parts thereof and a resilient outer tread secured to said band.

In testimony whereof, I affix my signature in presence of two witnesses.

HERMAN BESSER.

Witnesses:
 HAZELL JOHNSON,
 MARGARET McDONALD.